(12) United States Patent
Matthews et al.

(10) Patent No.: US 7,197,520 B1
(45) Date of Patent: Mar. 27, 2007

(54) TWO-TIER BACKUP MECHANISM

(75) Inventors: Kevin C. Matthews, Falcon Heights, MN (US); Guido Westenberg, Minneapolis, MN (US); Robert C. Anderson, Brooklyn Park, MN (US); Donald J. Stryker, Saint Paul, MN (US)

(73) Assignee: Veritas Operating Corporation, Mountain View, CA (US)

( * ) Notice: Subject to any disclaimer, the term of this patent is extended or adjusted under 35 U.S.C. 154(b) by 476 days.

(21) Appl. No.: 10/824,091

(22) Filed: Apr. 14, 2004

(51) Int. Cl.
*G06F 12/00* (2006.01)
*G06F 17/00* (2006.01)

(52) U.S. Cl. .............. 707/204; 707/200; 707/201; 707/202; 707/203

(58) Field of Classification Search ......... 707/200–204
See application file for complete search history.

(56) References Cited

U.S. PATENT DOCUMENTS

| | | | | |
|---|---|---|---|---|
| 5,454,099 A | * | 9/1995 | Myers et al. | 714/6 |
| 5,764,877 A | * | 6/1998 | Lomet et al. | 714/6 |
| 5,822,780 A | | 10/1998 | Schutzman | |
| 5,930,824 A | * | 7/1999 | Anglin et al. | 711/162 |
| 6,311,252 B1 | | 10/2001 | Raz | |
| 7,103,740 B1 | * | 9/2006 | Colgrove et al. | 711/162 |
| 2002/0069324 A1 | | 6/2002 | Gerasimov et al. | |
| 2002/0120763 A1 | | 8/2002 | Miloushev et al. | |
| 2003/0023713 A1 | | 1/2003 | Slater et al. | |
| 2003/0046270 A1 | | 3/2003 | Leung et al. | |
| 2003/0056069 A1 | | 3/2003 | Cabrera et al. | |
| 2003/0065898 A1 | | 4/2003 | Flamma et al. | |
| 2003/0074600 A1 | * | 4/2003 | Tamatsu | 714/6 |
| 2004/0039891 A1 | | 2/2004 | Leung et al. | |
| 2004/0093361 A1 | * | 5/2004 | Therrien et al. | 707/204 |
| 2005/0021869 A1 | * | 1/2005 | Aultman et al. | 709/249 |

* cited by examiner

*Primary Examiner*—Apu A. Mofiz
*Assistant Examiner*—Cindy Nguyen
(74) *Attorney, Agent, or Firm*—Robert C Kowert; Meyertons, Hood, Kivlin, Kowert & Goetzel, P. c.

(57) ABSTRACT

System and method for performing two-tier backups in file systems without requiring Hierarchical Storage Management (HSM). A two-tier backup mechanism may perform first-tier backups of dynamic and candidate static data, and second-tier backups of candidate static data. Data is examined by the two-tier backup mechanism and, if the data qualifies as candidate static data, metadata is created for the data. Candidate static data and its metadata are copied to first-tier backups along with dynamic data, and are also copied to second-tier backups a specified number of times, after which the static data is reclassified as "static copied data". Only metadata for static copied data is written to the first-tier backups. Embodiments may be implemented in file systems that do not support HSM and in file systems that support HSM, whether HSM is operational or not.

31 Claims, 11 Drawing Sheets

| Date | First-tier backup activity | Second-tier backup activity | Backup Contains |
|---|---|---|---|
| Friday 4-Jan-2005 | Incremental | | All data and metadata |
| Saturday 5-Jan-2005 | Incremental | | All data and metadata |
| Sunday 6-Jan-2005 | Full | | All data and metadata |
| Sunday 13-Jan-2005 | Full | | All data and metadata |
| Sunday 20-Jan-2005 | Full | | All data and metadata |
| Sunday 27-Jan-2005 | Full | | All data and metadata |
| Sunday 3-Feb-2005 | Full | | All data and metadata |
| Friday 8-Feb-2005 | Incremental (new DMAPI attribute) | Static Set Copies Made | Only metadata |
| Saturday 9-Feb-2005 | Incremental (new DMAPI attribute) | | Only metadata |
| Sunday 10-Feb-2005 | Full | | Only metadata |
| Sunday 17-Feb-2005 | Full | | Only metadata |
| ... etc ... | Full | | Only metadata |
| Thursday 4-July-2005 | Incremental | Static Set copies are *obsolete* | All data and metadata |
| Friday 5-Jul-2005 | Incremental | | All data and metadata |
| Saturday 6-Jul-2005 | Incremental | | All data and metadata |
| Sunday 7-Jul-2005 | Full | | All data and metadata |
| Sunday 14-Jul-2005 | Full | | All data and metadata |
| Sunday 21-Jul-2005 | Full | | All data and metadata |
| Sunday 28-Jul-2005 | Full | | All data and metadata |
| Sunday 4-Aug-2005 | Full | | All data and metadata |
| Friday 9-Aug-2005 | Incremental (new DMAPI attribute) | Static Set Copies Made | Only metadata |
| Saturday 10-Aug-2005 | Incremental (new DMAPI attribute) | | Only metadata |
| Sunday 11-Aug-2005 | Full | | Only metadata |
| Sunday 18-Aug- | Full | | Only metadata |

*FIG. 9*

TWO-TIER BACKUP MECHANISM

BACKGROUND OF THE INVENTION

1. Field of the Invention

This invention is related to the field of computer systems and, more particularly, to data backups of file systems.

2. Description of the Related Art

Conventional backups of file systems may take a considerable amount of time and backup media. In many file systems, a significant portion of the data (e.g. files) is not changed after creation or an initial period of access. The data that are backed up in a full backup are typically the same data that were backed up in the last full backup or even on earlier full backups.

The conventional mechanism to back up data is to periodically perform a full backup of everything in the file system, for example once a week or once a month, and to perform incremental backups between full backups, for example every day. FIG. 1 illustrates a typical backup pattern using a conventional backup mechanism. Using the conventional mechanism, full backups are performed periodically, and each full backup makes a copy of 100% of the data in the file system, even though a large percentage (e.g., 90%) of that data may not have changed since the previous full backup. Therefore, using the conventional backup mechanism, data for which one or more copies may exist on previous full backups 108 are backed up on each current full backup 104.

To perform a restore from conventional backups, a current full backup 104 is typically restored, and then any changed data are restored from the incremental backups 106. Typically, the file system cannot be brought back online and made operational until all the data have been restored.

HSM (Hierarchical Storage Management) systems may be installed in some file systems to move file data from (expensive) online storage to (cheaper) offline media—typically, but not necessarily, tape. The file metadata (inode, directory entry) is left online to provide transparency for applications using the file system. Typically, only when an application attempts to use data that has been moved offline will the HSM copy the data back to disk.

An HSM system and a conventional backup mechanism may be used together to reduce the time and media needed to make backup copies, as illustrated in FIG. 2. The HSM system may sweep through a file system looking for "old" data—data that have not changed recently. The HSM system may make copies of the data in HSM-specific pools or volumes. Once the required HSM copies have been made, the file is called "migrated". The backup mechanism, if it is able to recognize data that has been migrated by the HSM file system, may not back up the data for a migrated file—only metadata (e.g. the directory entry and inode metadata) may be backed up. For example, when 90% of the data in a file system is old (unchanging), eventually all of that data will have been migrated by HSM. Then, a typical full backup of the file system will copy only 10% if the data, and all of the file system metadata.

Thus, HSM may be used to identify unchanging data and make backup copies of that data to special pools not used by the conventional full and incremental backup processes. Note that the benefit of HSM to conventional backups may be realized regardless of whether the customer actually uses HSM to remove some of the data from the file system. The benefit may be realized even if the data is left online.

However, there are several problems with using HSM in combination with a backup mechanism to improve the performance of conventional backups. For one thing, this solution requires the configuration and administration of two different mechanisms—the HSM system and the backup mechanism. HSM is complex, and it may take considerable administrative effort to set up and maintain an HSM system. HSM may also have scalability issues when dealing with file systems containing more than a few million files. An HSM system may have its own proprietary databases for keeping track of offline volumes and migrated data. These databases may be different from standard backup mechanism databases and catalogs. The backup mechanism must be able to recognize data that have been migrated by the HSM system and for which there are sufficient copies made by the HSM system. In addition, not all file systems have the infrastructure (e.g., a DMAPI implementation) required to support HSM systems, so there are file systems that cannot benefit from the improvements that HSM may offer in conventional backups. Further, data stored on the HSM storage media may be in a different storage format than data stored on the backup media. Backup utilities typically have standard functions that work with the backup format; the HSM format may not be usable by backup utility functions.

Another alternative for improving the performance of backups is the "synthetic full backup". Synthetic full backups are synthesized from existing full backups. In a synthetic backup, instead of doing a full backup from the file system from "scratch", a (copy of a) previous full backup is used; data that have been deleted from the file system are subtracted from the full backup and data that are new or have changed on the file system are added to the full backup. From that, a new "synthetic" full backup is generated. The synthetic backup will still end up copying unchanging data, since synthetic full backups require rewriting older data every time.

SUMMARY

Embodiments of a system and method for two-tier backups of data in file systems that reduce the time and media required for "full backups" without requiring Hierarchical Storage Management (HSM) are described. Embodiments of the two-tier backup mechanism may divide data into two classes—dynamic (changing) data and static (unchanging, or aged) data. Dynamic data (also called first-tier data) are data that have changed or been created recently. Static data (also called-second tier data) are data that have not changed recently. Static data are classified as either candidate static data or static copied data. The two-tier backup mechanism may perform two tiers of backups, herein referred to as first-tier backups (full backups and incremental backups) and second-tier backups. Note that "data" as used herein includes files, portions of files, records (e.g. database records), and in general any type of data that can be stored on computer media.

Data are examined by the two-tier backup mechanism and, if the data qualify as static data, metadata is created for the data. At this point, the static data is classified as "candidate static data". Candidate static data and its metadata are backed up both in first-tier backups according to a user-defined schedule, along with dynamic data, and in addition are backed up in second-tier backups according to a user-defined schedule. Candidate static data are copied to second-tier backup media a specified number of times in the second-tier backups, after which the static data are considered sufficiently backed up and are reclassified as "static copied data". Static copied data are not copied to the first-tier backups. Only metadata for the static copied data are written to the first-tier backups. Second-tier backups may be performed while the file system is operational, and may be performed during periods of relatively less activity.

The metadata created for the static data may be used by the two-tier backup mechanism, for example, to determine if there are sufficient copies of candidate static data on second-tier backups, and to determine where static copied data is located on the second-tier backup media during restore operations.

Embodiments of the two-tier backup mechanism may be implemented in file systems that include the infrastructure to support Hierarchical Storage Management (HSM), whether or not HSM is installed and operational on the file system, and in file systems that do not include the infrastructure to support HSM. Embodiments may not require Data Management API (DMAPI) or any other particular mechanism for generating and handling file metadata for online and offline storage and retrieval of files, though embodiments may use DMAPI or some other mechanism (e.g. reparse points or named data streams) as a metadata mechanism. In one embodiment, the two-tier backup mechanism may be integrated with an HSM system to enable the HSM system to use the two-tier backup mechanism as the data store and data transfer mechanism for the file system.

In one embodiment, static copied data may be purged from the file system and become classified as offline (static) data. Metadata for offline static data may remain online on the file system, and may be backed up in first-tier backups.

In one embodiment, to restore a file system, the first-tier backups are restored, including dynamic data, candidate static data, and metadata, and then any necessary or desired static copied data from second-tier backups may be restored. In one embodiment, the restore from second-tier backup media may be performed, for example by one or more background processes, after the file system has been made operational after restore of the first-tier backup.

BRIEF DESCRIPTION OF THE DRAWINGS

The following detailed description makes reference to the accompanying drawings, which are now briefly described.

FIG. 9 is a table illustrating the life cycle of a file in a file system implementing a two-tier backup mechanism according to one embodiment.

Figure 1:
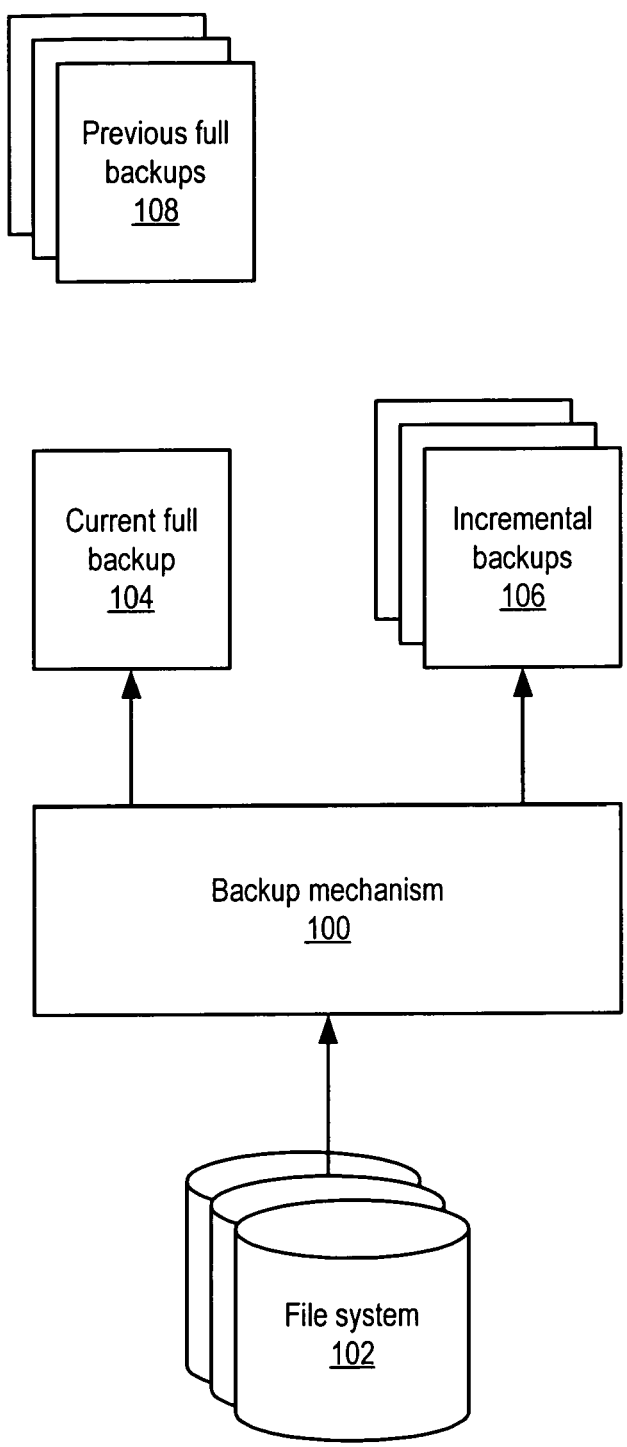
FIG. 1 illustrates a prior art typical backup pattern using a conventional backup mechanism.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for two-tier backups of data in file systems that reduce the time and media required for "full backups" without requiring Hierarchical Storage Management (HSM) are described. The time needed for full backups using conventional backup mechanisms may be reduced if additional copies are not made for data that already has been copied a sufficient number of times. Embodiments of the two-tier backup mechanism may reduce backup time for file systems when compared with conventional backup mechanisms, in particular file systems where a significant portion of the data are not modified often, if at all, and may reduce the total cost of storage management.

Embodiments of the two-tier backup mechanism may divide backed up data into two classes—dynamic (changing) data and static (unchanging) data. Dynamic data (also called first-tier data) are data that have changed or been created recently. Static data (also called-second tier data) have not changed recently. For example, dynamic data may be data that have changed within the past 30 days. Static data are then that data that was last modified more than 30 days ago. The purpose of this division of data is to avoid recopying files for which there are sufficient valid backup copies.

Using an embodiment of the two-tier backup mechanism, static data that have not changed for a period and for which sufficient backup copies have been generated are not backed up in full backups or incremental backups (collectively referred to as "first-tier backups"). Static data are copied to backup media a specified number of times in second-tier backups, after which the static data are sufficiently backed up and no longer copied to the first-tier backups. Metadata (e.g. directory entries and inode metadata) for the data for which sufficient second-tier copies have been made and thus is no longer copied to the first-tier backups may be written to the first-tier backups. The metadata may be used by the two-tier backup mechanism, for example, to determine if there are sufficient copies of the data on second-tier backups, and may also be used to determine where the data may be found on the second-tier backup media during restore operations.

Embodiments may reduce the backup time for file systems containing a significant percentage of unchanging data without requiring the complexity of a full Hierarchical Storage Management (HSM) system. This allows the two-tier backup mechanism to be implemented both in file systems that include the infrastructure to support HSM, whether or not HSM is installed and operational on the file system, and in file systems that do not include the infrastructure to support HSM. Embodiments may not require HSM to be installed and active on the file system, and may not require DMAPI or any other particular mechanism for generating and handling file metadata for online and offline storage and retrieval of files, though embodiments may use DMAPI or some other mechanism (e.g. reparse points or named data streams) as a metadata mechanism. Thus, embodiments may be implemented on both HSM-capable and non-HSM capable file systems. In one embodiment, the two-tier backup mechanism may be integrated with an HSM system to enable the HSM system to use the two-tier backup mechanism as the data store and data transfer mechanism for the file system.

This document will use the term "dynamic" data to describe data that have been created or modified recently and thus need to be included in a full backup. The term "static" data will be used to describe data that have not changed recently and thus may or may not be backed up, depending on if there are a sufficient number of copies of the static data. Static data for which there may or may not be enough copies on second-tier backups may be referred to as "candidate static data". Static data for which there are enough copies on second-tier backups, and thus are not backed up to first-tier backups or second-tier backups, may be referred to as "static copied data". Metadata may be created for static data, and, for example, may be used to indicate how many copies of the static data are on second-tier backups and the location(s) of the copies on the second-tier backups. For static copied data, only metadata are backed up. In one embodiment, static copied data may be purged from the file system and become offline (static) data. The term "data" as used herein includes files, portions of files, records (e.g. database records), and in general any type of data that can be stored on computer media.

The term "static set" may be used to refer to the backed-up static data (the second-tier backups). For example, the two-tier backup mechanism may be configured so that data that have a "modified time" of at least 30 days old are considered "aged" and thus classifiable as static data. In one embodiment, the next first-tier backup of the file system will recognize aged data as static and, if it has not already been done previously, assign metadata to the data (e.g., in one embodiment, a GUID and a DMAPI attribute). In another embodiment, the second-tier backup process may perform the task of recognizing data as candidate static data and creating the metadata for the candidate static data. Once data is recognized as aged and metadata is assigned to it, the data is candidate static data. According to the schedule(s), copies of this candidate static data will be made to the static set (second-tier backups).

The term "working set" may be used to refer to the backed-up data (e.g. files) that are not in the static set (the first-tier backups). The working set may include data that have been modified recently (dynamic data), as well as the static data for which enough static set copies have not yet been created (i.e. candidate static data). Once data (e.g. a file) has enough static set copies, the data will no longer be copied by first-tier backups of the file system; the data is considered static copied data. Only the metadata for the data will be backed up to first-tier backups.

FIGS. 3 through 8 illustrate means for backing up candidate static data from a file system on one or more data storage devices to second-tier backup media, and means for backing up dynamic data, candidate static data, metadata for candidate static data, and metadata for static copied data from the file system to first-tier backup media.

Figure 3:
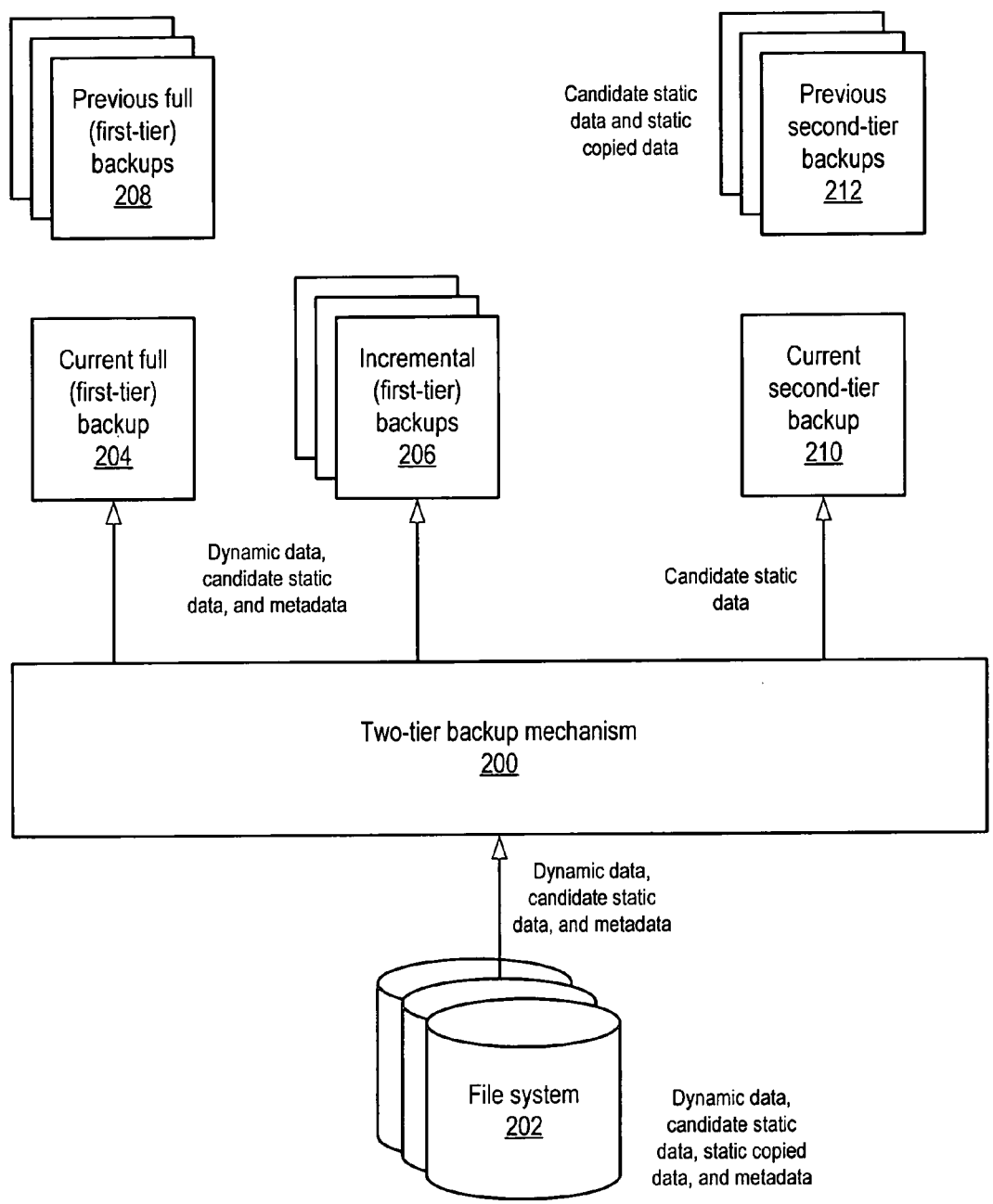
FIG. 3 illustrates backing up data from a file system with a two-tier backup mechanism according to one embodiment.

FIG. 3 illustrates backing up data from a file system with a two-tier backup mechanism according to one embodiment. Dynamic data from file system 202 are backed up on the first-tier backup media by the two-tier backup mechanism 200. First-tier backups may include full backups (e.g. current full backup 204 and previous full backups 208) and one or more incremental backups 206, performed according to a user-defined schedule. Candidate static data from file system 202 are also backed up in the "second tier" backup media by the two-tier backup mechanism 200 if the two-tier backup mechanism determines that there are not enough copies of the candidate static data on second-tier backup media. If the two-tier backup mechanism 200 determines that there are enough copies of a candidate static data, then that data is considered static copied data by the two-tier backup mechanism 200 and is not backed up on the first-tier or second-tier backups. In one embodiment, there may be metadata associated with the candidate static data that may be used to determine if there are or are not enough copies of the candidate static data. Second-tier backups include a current second-tier backup 210 and one or more previous second-tier backups 212.

In one embodiment, metadata for the static copied data may be backed up on the first-tier backups. This metadata may indicate where copies of the static copied data are located on the second-tier backup media (current second-tier backup 210 and one or more previous second-tier backups 212), and may be used to retrieve the static copied data, if necessary or desired. Note that static copied data may remain online in the file system 202, or may be purged from the file system 202 while remaining stored in the second-tier backup media. In one embodiment, metadata for the candidate static data may also be backed up on the first-tier backups.

Figure 2:
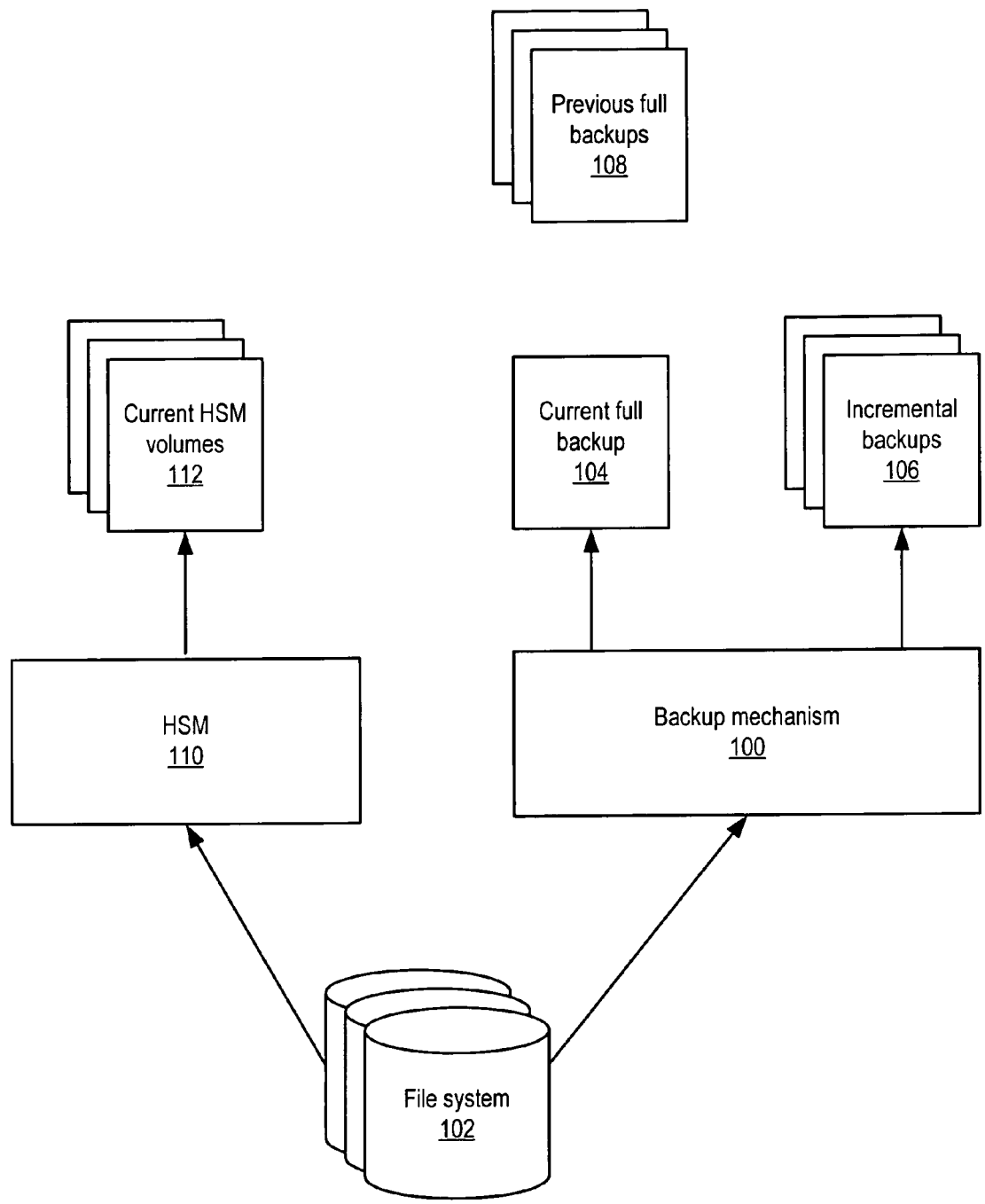
FIG. 2 illustrates a prior art HSM system and conventional backup mechanism used together to reduce the time and media needed for backups.

Embodiments of the two-tier backup mechanism 200 may reduce the amount of data stored on full backups when compared to conventional backup mechanisms, thus reducing the time for full backups, and may also reduce the amount of storage media consumed by backups. Embodiments provide these benefits using a single mechanism, the two-tier backup mechanism 200, rather than two mechanisms (e.g., a backup mechanism and HSM, as illustrated in FIG. 2). Thus, there is only one media format for all backup media, and two-tier backup mechanism catalogs and media drivers are used. All the data on the backup media are in a format that can be read and used by the two-tier backup mechanism 200.

Embodiments of the two-tier backup mechanism 200 do not require HSM. Embodiments may be used regardless of whether the traditional HSM functions (file purge, automatic copy back) are used, and thus may be used in file systems that do not include the infrastructure to support HSM, as well as in file systems that do include the infrastructure to support HSM, whether HSM is installed or not. In one embodiment, if a two-tier backup mechanism 200 is installed on a system that supports HSM, the traditional HSM functions may be enabled, if desired, by allowing the removal of file data blocks for static copied files (making them offline files), and enabling the automatic copy back of those blocks when an application reads the data. In one embodiment, a two-tier backup mechanism 200 may be integrated with an HSM system. The HSM system may use the integrated two-tier backup mechanism 200 as the data store and data transfer mechanism for the file system.

In one embodiment, to configure first-tier and second-tier backups, the user sets up a policy that indicates what data is to be backed up, classifications for the second-tier backups (e.g., when data is to be considered static), how many copies of candidate static data are sufficient, and when to perform full (first-tier) backups and second-tier backups. Second-tier backups may be performed while the file system is operational, and may be performed during periods of relatively less activity. There are two sets or pools of tapes, one for first-tier backups and one for second-tier backups.

Embodiments of the two-tier backup mechanism, while applicable in any file system, may be particularly applicable in file systems where there is a significant amount of static data. Applications such as large databases where most or all of the data are frequently modified may not realize some or all of the benefits of the two-tier backup mechanism. An exemplary system in which embodiments of the two-tier backup mechanism may be implemented is a delivery company with large numbers of files used to keep records of deliveries for long periods. It may not be necessary or desirable to back up all of the files, including dynamic and static files, in each full backup; however it may be desirable to keep the static files online and/or available offline in second-tier backups. Using the two-tier backup mechanism, static, inactive files are not backed up to the full (first-tier) backup after a sufficient number of copies are made on the second-tier backups.

Embodiments of the two-tier backup mechanism may incrementally add static data to a distinct set of volumes (second-tier backups). Embodiments of the two-tier backup mechanism do not produce a single backup image for a point in time. Instead, points in time may be specified (e.g., Sunday mornings) when full (first-tier) backups of the dynamic data, candidate static data, and metadata for static copied data, are generated, and when second-tier backups of candidate static data are generated. To restore a file system to a point in time, the first-tier backups are restored, and then any necessary or desired static copied data from second-tier backups may be restored. In one embodiment, the restore from second-tier backup media may be performed, for example by background processes, after the file system has been made operational after restore of the first-tier backup.

One embodiment may implement a backup media volume usage and rotation policy for backup utilities. Backup media may include, but are not limited to, magnetic media such as tape and optical media such as optical disks. One embodiment may ensure that the same backup media format is used for all backed-up data. In one embodiment, a backup catalog may be used to track where valid copies of data are stored. The backup catalog may indicate the media on which each file resides, and the location of the file on that media. For example, if the media is a tape, the catalog may identify the tape on which the file resides and the byte offset on the tape for that file.

One embodiment may provide a consolidation mechanism to compress backup media that contain a large fraction of "no longer needed" data into more efficient volumes. Using the consolidation mechanism, backup media that contain mostly expired images may be combined into a set of more efficiently used volumes. Consolidation may compress images and volumes that have a significant fraction of unneeded files (dead files), and may create new images and volumes that are denser than the original images and volumes from which they were created. The consolidation mechanism may be used to maintain a dense and efficient set of backup media.

In one embodiment, an administrator may initiate the consolidation mechanism. The consolidation mechanism may determine which consolidations will result in volumes being freed. The administrator may then select which consolidations are to be performed, and then may commit these consolidations, if desired.

In one embodiment, consolidations may be initiated on a regular basis, by the administrator or automatically according to a schedule, regardless of how many tape volumes might be freed. Doing so may force the recopy of saved data on a regular basis.

One embodiment may provide a scheduled consolidation mechanism that determines what consolidations are to be performed, and then begins performing the consolidations within a specified period. In one embodiment, the scheduled consolidation mechanism may determine how many tapes drives are needed for all the scheduled consolidations. Scheduled consolidations that are not possible due to resource limitations may be deferred.

In one embodiment, the consolidation mechanism may take advantage of files that are still "on disk" (in the file system). If a file is still on disk, the file may be copied to a new image from disk. For example, when the two tier backup mechanism is used without HSM, many of the files copied to a new image may be copied from disk. Note that static files that have been removed or changed, but whose data is still needed, cannot be copied from a current disk image.

Dead space in the file system may be recovered by purging files from the file system for which an effective retention period, as specified by the administrator, has passed. For example, a file that has not changed in 180 days may be purged from the file system, as the file's data has been backed up in the static set (second-tier backups), and the file may now be removed from the file system. Note that the static set (second-tier) images of the removed file are not dead (i.e. are not necessarily no longer needed) when the file is purged. If the file is restored from a recent first-tier backup, the file's metadata will be in that image. Copies of the file's data may be located, if necessary or desired, in the static set (second-tier backups) using the file's metadata, for example using the file's GUID.

Figure 4:
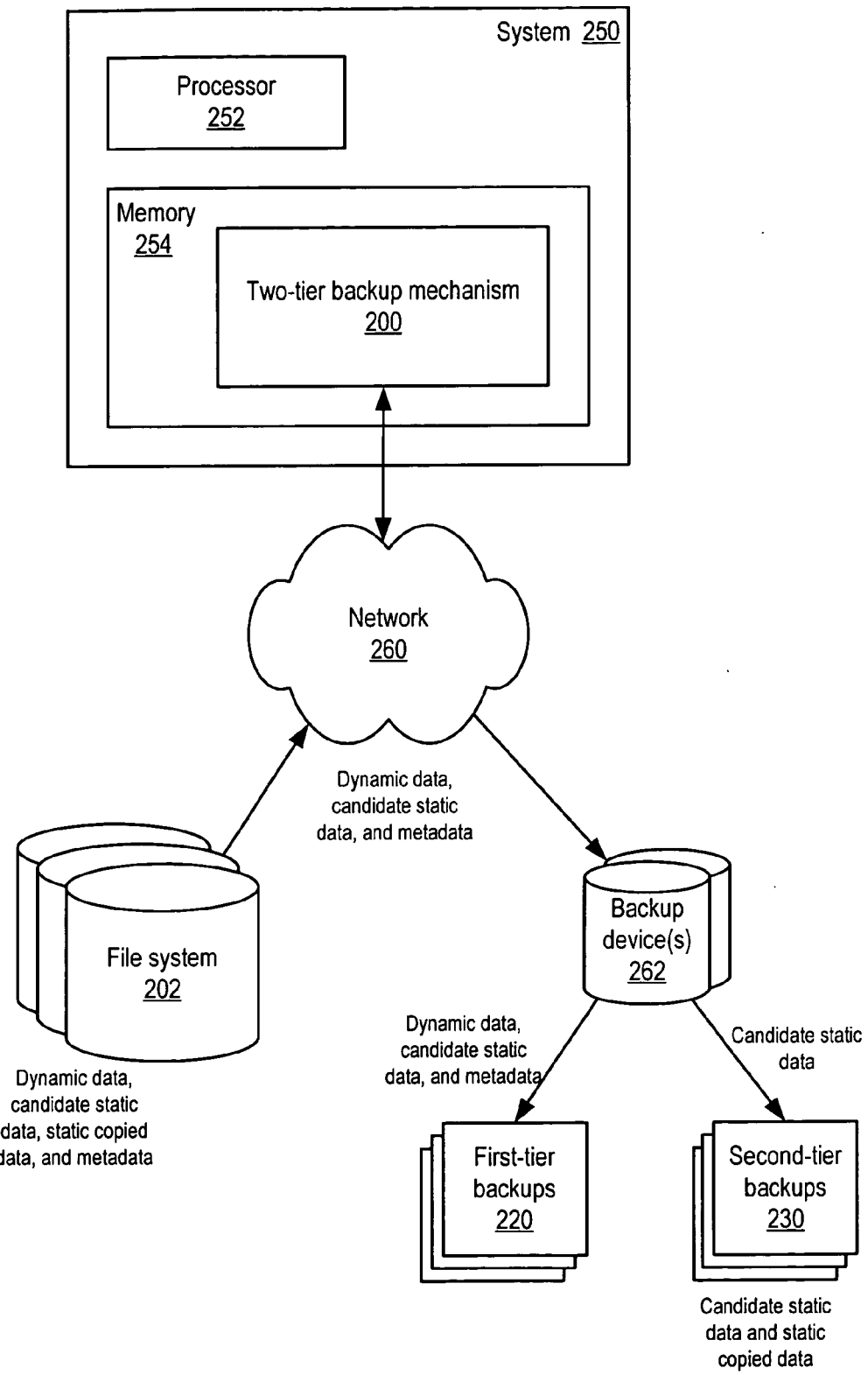
FIG. 4 illustrates a system implementing a two-tier backup mechanism in a network storage environment according to one embodiment.

FIG. 4 illustrates a system implementing a two-tier backup mechanism in a network storage environment according to one embodiment. System 250 may be any of various types of devices, including, but not limited to, a personal computer system, desktop computer, laptop or notebook computer, mainframe computer system, workstation, network computer, or other suitable device. System 250 may include at least one processor 252. The processor 252 may be coupled to a memory 254. Memory 254 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

System 250 may couple over a network 260 to one or more storage devices on which a file system 202 may be implemented and one or more backup devices 262. Network 260 may be, for example, a Storage Area Network (SAN), a LAN with Network-Attached Storage (NAS), or any network capable of coupling devices to a system 250. The storage devices may include any of one or more types of storage devices including, but not limited to, stand-alone storage devices ("disks"), storage systems such as RAID (Redundant Array of Independent Disks) systems, disk arrays, and JBODs (Just a Bunch Of Disks, used to refer to disk cabinets that do not have a built-in RAID controller). Backup devices 262 may include any of one or more types of backup devices, including, but not limited to, various types of tape devices and optical storage devices.

System 250 may couple, over network 260 or over one or more other networks, for example over a wired or wireless network or networks, to one or more other devices (not shown), for example various client systems that may include one or more applications for accessing file system 202, via one or more wired or wireless network interfaces.

System 250 may include, in memory 254, a two-tier backup mechanism 200. Two-tier backup mechanism 200 may back up data from file system 202 to backup media on one or more backup devices 262 according to a user-defined schedule for first-tier backups 220 and second-tier backups 230. In addition to the backup schedule, the user may also define the number of copies of static data that is considered sufficient to move the static data from the category of candidate static data, backed up to both the first-tier backups 220 and to the second-tier backups 230, to the category of copied static data, for which only metadata is backed up to the first-tier backups 220. In one embodiment, metadata associated with static data may be used to track the number of copies that exist for the static data, and may also be used to track where on the second-tier backup media the copies may be located.

Note that two-tier backup mechanism 200 does not require HSM on file system 202, nor does it require the infrastructure to support HSM on file system 202. Embodiments of two-tier backup mechanism 200 thus may be implemented on file systems that do not include the infrastructure required to support HSM and on file systems that do include the infrastructure required to support HSM, whether HSM is installed and in use or not.

Embodiments of a two-tier backup mechanism 200 may allow full (first-tier) backups 220, and backups in general, to be performed in less time than in conventional backup methods by not backing up static data for which there are sufficient copies in second-tier backups 230. Rather than backing up all data on a full backup, two-tier backup mechanism 200 backs up to the first-tier backup media only data that are recently created or modified according to a user-defined policy—e.g. data created or modified in the last one, two or three months. Data that is static (was not created and has not been modified for a period specified by the user-defined policy) is backed up to the first-tier backup media only if the two-tier backup mechanism 200 determines that there are not a sufficient number copies of the static data already on second-tier backups. Metadata may be associated with the static data to track the number of copies of the static data on second-tier backups and to track the location of the copies of the static data on second-tier backups. The sufficient number of copies may be specified in the user-defined policy. This (candidate) static data is also backed up to second-tier backup media if two-tier backup mechanism 200 determines that there are not enough copies on second-tier backups. If two-tier backup mechanism 200 determines that there are enough copies of the static data on second-tier backups according to the user-defined policy, then that static data is considered "static copied data" and is not backed up to first-tier or second-tier backup media. In one embodiment, metadata for the static copied data may be backed up to the first-tier backup media.

Second-tier backups 230 may be performed while the file system 202 is operational, and may be performed during periods of relatively less activity.

In one embodiment, static copied data may remain online in the file system 202, or may be taken offline (i.e. deleted from file system 202 while remaining on second-tier backups 230). Static copied data left online may be marked using the metadata so that the two-tier backup mechanism can determine that the static copied data are inactive and sufficiently backed up (have enough copies of second-tier backups 230) so that the static copied data are not backed up to first-tier backups 220 or second-tier backups 230. Only the metadata for the static copied data are backed up to the first-tier backups 220.

Figure 5:
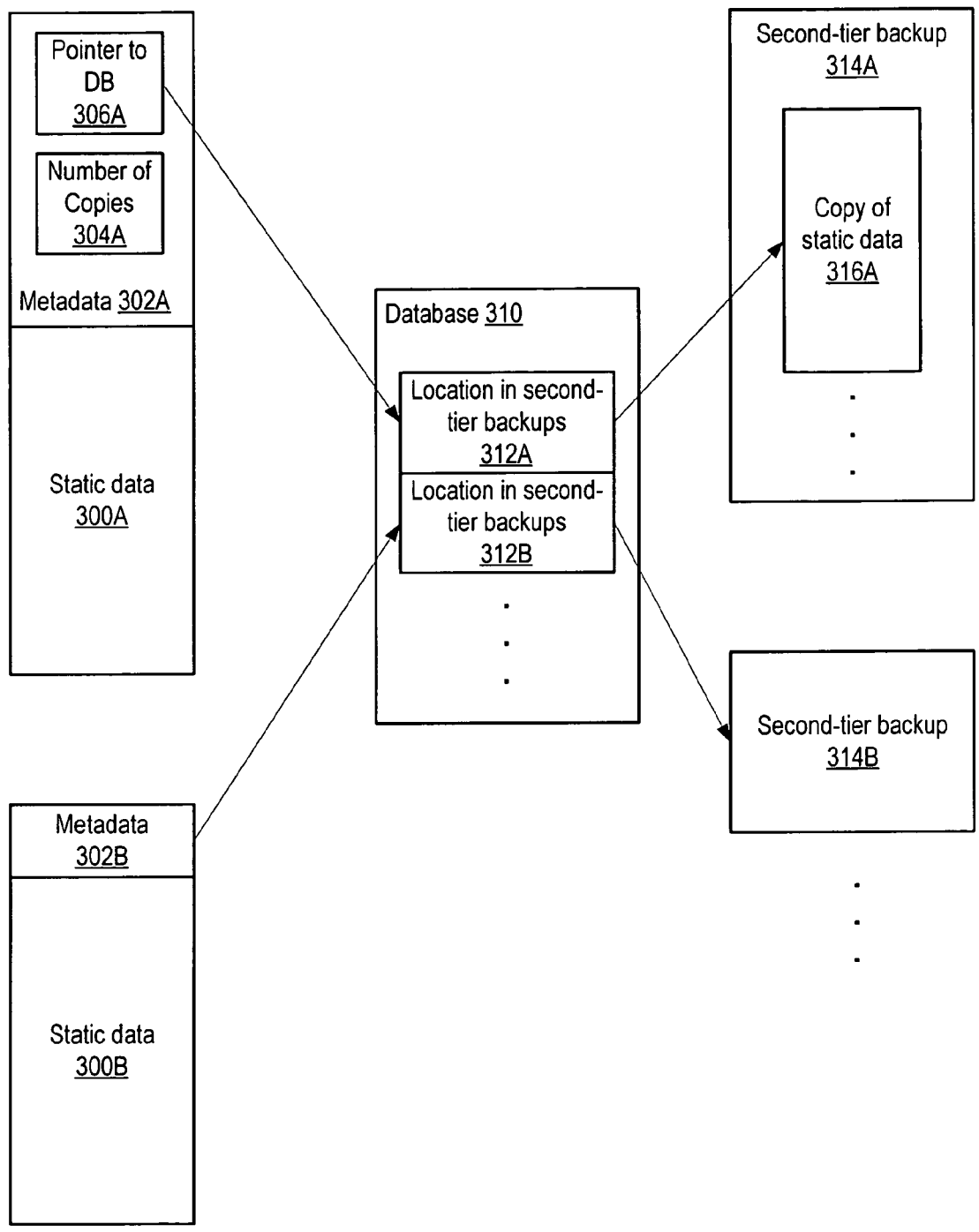
FIG. 5 illustrates metadata for data in a file system implementing a two-tier backup mechanism according to one embodiment.

FIG. 5 illustrates metadata for data in a file system implementing a two-tier backup mechanism according to one embodiment. Metadata 302 may be generated for and associated with static data 300. Each static data 300 in a file system may have an associated metadata 302. A metadata 302 may indicate zero or more of, but is not limited to: if there are copies of the associated static data 300 on second-tier backups 314; how many copies of the associated static data 300 there are; one or more locations of copies of the static data 300 on second-tier backups 314; and descriptive information for the static data 300. This descriptive information may be used, for example, to determine if the static data 300 is the same as copies of the static data 300 on the second-tier backups 314.

In one embodiment, each metadata 302 may include an indication of the number of copies 304A of static data 300 on second-tier backups 314, and may also include an indication or pointer 306 to a database 310. Database 310 may include indications of locations in second-tier backups 312 where copies 316 of static data 300 can be found on second-tier backups 314. In one embodiment, database 310 may include one or more catalogs, as described below. Thus, in one embodiment, a restore mechanism, such as that illustrated in FIG. 10, may use the metadata 302 to locate a copy of static data 316 on second-tier backups 314 and restore the copy to the file system, if necessary or desired.

Any mechanism and metadata structure for generating and handling metadata for online and offline storage and retrieval of data may be used in embodiments. Note that file systems may or may not support a particular metadata mechanism, so embodiments may support two or more different mechanisms to match the file system environment on which the two-tier backup mechanism is implemented. In one embodiment, on some systems (e.g. Unix systems), DMAPI may be used as the metadata mechanism. In one embodiment, on some systems (e.g. Windows systems), reparse points may be used as the metadata mechanism. In one embodiment, on some systems (e.g. standard UFS file systems, HP file systems) named data streams may be used as the metadata mechanism. In some embodiments, on all file systems or only on file systems that do not support other metadata mechanisms, a custom metadata mechanism may be implemented to support the two-tier backup mechanism. In general, any mechanism that enables the keeping of metadata to determine if data has been taken offline or not and where the copy or copies of the data are may be used. In any case, embodiments may use the metadata automatically without requiring HSM to be installed.

As mentioned, in one embodiment, DMAPI may be used as the metadata mechanism. DMAPI is an API and a set of file system concepts that allow an HSM application to be implemented. DMAPI allows the HSM application to place an opaque "DM attribute" on any file. Some file systems, for example VERITAS' VxFS, support the DMAPI interface. In one embodiment, DMAPI attributes may be used in these file systems by the two-tier backup mechanism as the metadata to keep track of the backup "state" of the data (e.g. files). The DMAPI attribute provides a handle on a file that is invariant even if the file name changes. The use of DMAPI as the metadata mechanism is described herein as an example. Other embodiments may use other mechanisms to keep track of the backup state of the data (i.e. as metadata), and the discussion of DMAPI as the metadata mechanism generally applies to those other mechanisms as well, with relevant details being different according to the particular mechanism used. Note that where the term "file" is used in this description, other types of data may be substituted.

A GUID is a 128-bit Globally Unique ID used to identify a file. In one embodiment, if the two-tier backup mechanism assigns a DMAPI attribute to a file, a new GUID will be assigned to the file. The GUID is stored in the DMAPI attribute.

In one embodiment, the two-tier backup mechanism needs to know if there are already sufficient copies of a file or if more copies are required. This may be difficult to determine if a file is renamed. In one embodiment, a file system attribute (e.g. the DMAPI attribute) may be used to determine if a file is the same file as one previously copied. In one embodiment, the DMAPI attribute (in connection with a File system daemon) stores the GUID of the file and allows the two-tier backup mechanism to determine when a file has been changed. Other embodiments may use other methods to determine if a file is the same file as one previously copied.

In one embodiment, the two-tier backup mechanism does not make new copies of static data for which there are already enough copies in the static set (second-tier backups). In one embodiment, the two-tier backup mechanism keeps track of the static files by assigning a GUID to each static file. The GUID may be used for bookkeeping instead of the original pathname of the file to avoid difficulties with renamed files. The two-tier backup mechanism assigns a DMAPI attribute to each static file; the attribute contains the GUID for the file. Note that GUIDs are used as an example and are not intended to be limiting; other embodiments may use other types of identifiers than GUIDs.

In one embodiment, the two-tier backup mechanism may use one set of catalogs for the first-tier backups and a different set of catalogs for the second-tier backups of candidate static data. The working set catalogs for a first-tier backup indicate both the dynamic and all static data (e.g., dynamic and static files). In a working set (first-tier backup) catalog, the entry for static data may include, but is not limited to, the GUID for the static data. Given the GUID, the copies of the static data may be found on the second-tier backups by looking in the second-tier backup catalogs.

In one embodiment, the second-tier backup catalogs use the GUID instead of the pathname to identify the data. A second-tier backup catalog may be searched based on the GUID. The second-tier backup catalog entries may also include the original pathname of the data, but this name may be for information only, as the pathname for the data may have changed.

The following is an exemplary catalog entry for a dynamic data (e.g. file) in the working set (first-tier backup) catalog, and is not intended to be limiting. The first column contains the exemplary field names; the second column contains the exemplary field content:

| Path | /fs1/kcm/foo |
| Static Data ID | null |
| ... | ... |

The following is an exemplary catalog entry for a static data in the working set (first-tier backup) catalog, and is not intended to be limiting. The first column contains the exemplary field names; the second column contains the exemplary field content:

| Path | /fs1/kcm/bar |
| Static Data ID | 123456789 |
| ... | ... |

The following is an exemplary catalog entry for a static data in the static set (second-tier backup) catalog, and is not intended to be limiting. The first column contains the exemplary field names; the second column contains the exemplary field content:

| Static Data ID | 123456789 |
| Original Path | /fs1/kcm/bar |
| ... | ... |

The working set full backup (first-tier backup) of a file system contains the metadata for all data—even static copied data. However, the actual data is copied in the working set backup (first-tier backup) only for dynamic data and candidate static data. Only the metadata for static copied data is copied to the first-tier backup for static copied data.

The following is an exemplary set of DMAPI attribute fields, and is not intended to be limiting:

| Field | Description |
|---|---|
| Version | Version of the Static File |
| GUID | Globally Unique ID that identifies the file |
| Status | Status of the Static File |
| Slice | Slice (online) Information |
| User-defined | User-defined attribute(s), if any |

The following is an exemplary set of values for the Status field, and is not intended to be limiting:

| Status | Meaning |
|---|---|
| Candidate | Static File, but not sufficient copies. |
| Copied | Static File - sufficient copies. |
| Offline | Static File - data blocks no longer on the file system. |

In one embodiment, typically only the candidate and copied static status values may be used. These values may indicate if there are sufficient copies of the data (file) in the static set (second-tier backups). In embodiments that support HSM, the offline status may be used to indicate that the data has been purged from the file system. Copies of the data may still be on the second-tier backups, and metadata for the purged data may be maintained online. The offline status may also be used during restore of the file system using a restore mechanism as described herein to determine whether data (e.g. a file) on the second-tier backups should be restored.

In one embodiment, the DMAPI attribute may include a copy count field that may be used, for example, to determine if static data is static copied data or candidate static data. Only the metadata is backed up for static copied data and purged data. The metadata and data are backed up for candidate static data. In one embodiment, a first-tier backup will copy only the metadata for static copied data. In one embodiment, saved metadata information may include, but is not limited to, the GUID and the static status information. In one embodiment, the GUID may be saved in the catalog, and the state information may be saved as part of the image The static set backup process (second-tier backup) copies static data for which additional copies are required (i.e. candidate static data). In one embodiment, data (e.g. a file) may be classified as candidate static data if it meets user-defined specifications for being "aged". In one embodiment, one or more other properties or aspects than simply the "age" of the data may be used in determining if data is classifiable as candidate static data. For example, file size and/or name requirements may be added to the user-defined specifications for qualifying data as candidate static data. In one embodiment using DMAPI as a metadata mechanism, once data is qualified as candidate static data, a new GUID may be saved in a new DMAPI attribute for the candidate static data. In one embodiment, data (e.g. a file) may be "volunteered" for candidate static status by a user or administrator via an API or CLI (Command Line Interface). In this case, the CLI/API assigns a GUID in a new DMAPI attribute (if one does not already exist) and a static status of "candidate static data" to the data.

In one embodiment, when an administrator, end user, or process is browsing the backup catalogs for the two-tier backups, the working set (first-tier) backup catalogs are being examined. Data (e.g. a file) is restorable as long as it exists in one of the working set (first-tier) catalogs. For example, if the working set catalogs are kept for two years, then a file is restorable for up to two years after it has been purged from the file system. A user might select a file for restoration from a catalog that is 18 months old. If the file was static, the 18-month old catalog will contain the GUID for the file, which can then be searched for in the static set (second-tier) catalogs to locate the file on the second-tier backups. If working set catalogs are kept for only two years, and if a file was purged more than two years ago, then that file no longer appears in any working set catalog. No references to a GUID means that it is "dead" space on the static set volumes and that space may be reclaimed, for example through a consolidation process.

When configuring two-tier backups, the administrator may configure and schedule second-tier backups as well as first-tier backups. In one embodiment, each schedule may use a distinct set of volumes so that static and dynamic data do not end up on the same volumes. Second-tier backups may be scheduled to perform while the file system is operational, and may be scheduled to occur during periods of relatively less activity.

Figure 6:
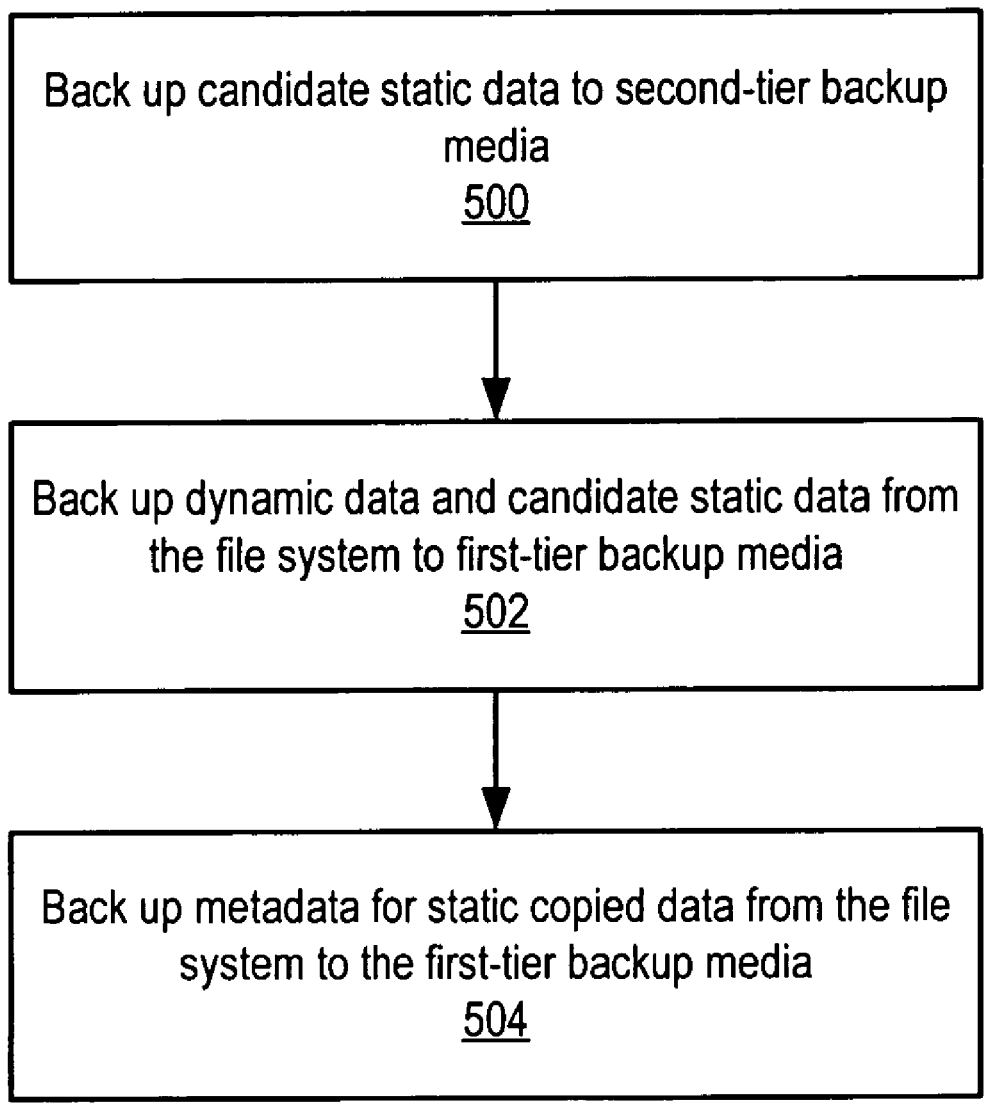
FIG. 6 is a flowchart illustrating a two-tier backup method for a file system according to one embodiment.

FIG. 6 is a flowchart illustrating a two-tier backup method for a file system according to one embodiment. As indicated at 500, candidate static data may be backed up in one or more second-tier backups, which may be performed periodically (at regular intervals) or aperiodically (not at regular intervals), from a file system to second-tier backup media on data backup devices according to a user-defined schedule. Second-tier backups may be performed while the file system is operational, and may be performed during periods of relatively less activity. Candidate static data is data in the file system that has not been modified for a user-specified period. As indicated at 502, dynamic data and the candidate static data may be backed up in one or more first-tier backups, which may be performed periodically or aperiodically, from the file system to first-tier backup media on the data backup devices according to a user-defined schedule. The dynamic data are data in the file system that have been created or modified in the user-specified period. As indicated at 504, only metadata for static copied data is backed up from the file system to the first-tier backup media in the first-tier backup(s). Static copied data are static data in the file system for which a specified number of copies have been previously backed up to the second-tier backup media. Metadata may be created for and associated with static data. The metadata may indicate how many copies of the associated static data have been generated on second-tier backups, and may also indicate a location or locations on the second-tier backup media where the associated static data may be found. The metadata may be used by the two-tier backup mechanism to determine the classification of data, e.g. whether the data is dynamic or static (candidate static or static copied), during second-tier and first-tier backups. The metadata may also be used during a restore of static copied data from the second-tier backup media.

Figure 7:
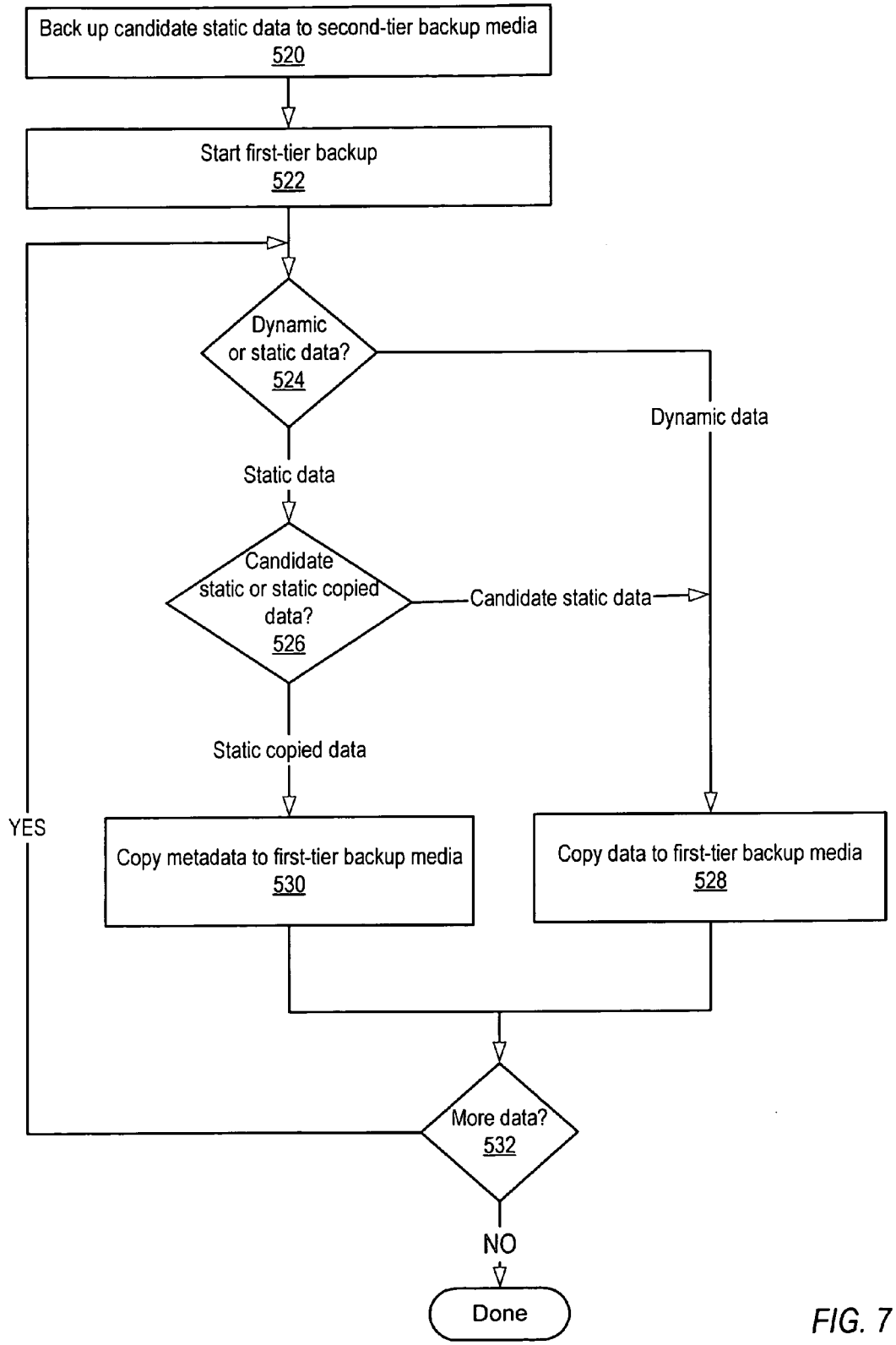
FIG. 7 is a flowchart illustrating a first-tier backup process according to one embodiment.

FIG. 7 is a flowchart illustrating a first-tier backup process according to one embodiment. As indicated at 520, candidate static data may be backed up in one or more second-tier backups, which may be performed periodically or aperiodically, from a file system to second-tier backup media on data backup devices according to a user-defined schedule. Second-tier backups may be performed while the file system is operational, and may be performed during periods of relatively less activity. As indicated at 522, a first-tier backup may be initiated to back up dynamic data, candidate static data, and metadata for static data from the file system to first-tier backup media on the data backup devices according to a user-defined schedule.

During both first-tier and second-tier backups, the two-tier backup mechanism may examine the data (e.g. each file) to determine if the data is dynamic data, candidate static data, or static copied data. In one embodiment, the data may have associated metadata (e.g. metadata associated with each file) that may be used to determine the type of data. In one embodiment, only candidate static data and static copied data has associated metadata. In this embodiment, when data (e.g. a file) is identified as static, a metadata structure may be created for the data. In one embodiment, this identification and creation of a metadata structure may be performed by the two-tier backup mechanism during first-tier backups. The identified static data is initially candidate static data, and is thus backed up in both first-tier backups and second-tier backups. Each time the candidate static data is backed up in second-tier backups, the metadata may be modified to indicate that a new copy of the candidate static data has been generated, and to indicate where on the second-tier backups the copy is located. In one embodiment, the metadata may be modified to include a pointer to a database that is modified to indicate where on the second-tier backups the copy is located.

As indicated at 524, during the first-tier backup, the two-tier backup mechanism may check data (e.g. a file) to determine if the file is dynamic data, candidate static data, or static copied data. In one embodiment, the two-tier backup mechanism may examine a status field of the metadata to determine the status of the data (e.g. dynamic data, candidate static data, or static copied data). Other embodiments may use other methods to determine the status of data. If the data is determined to be dynamic, then the dynamic data is copied to the first-tier backup media as indicated at 528. In one embodiment, the two-tier backup mechanism may check to see if the data has associated metadata; if it does not, the data is known to be dynamic data. In another embodiment, there may be metadata associated with the data, and the two-tier backup mechanism may check the metadata to determine if the data is dynamic or static.

If, at 524, the data is determined to be static data, the two-tier backup mechanism may examine the metadata associated with the static data to determine if the static data is candidate static data or static copied data. In one embodiment, the two-tier backup mechanism may examine a status field of the metadata to determine the status of the data (e.g. dynamic data, candidate static data, or static copied data). In another embodiment, the two-tier backup mechanism may examine the metadata to determine the number of copies of the static data that are on second-tier backups. If the number of copies are sufficient according to a user-specified threshold (e.g., 3 copies), then the static data is static copied data. If the number of copies is insufficient, then the static data is candidate static data. If the static data is determined to be candidate static data, then the candidate static data is copied to the first-tier backup media as indicated at 528. If the static data is determined to be static copied data, then the static copied data is not copied to the first-tier backup media. As indicated at 530, the metadata for the static copied data is copied to the first-tier backup media.

At 532, if there are more data, then the first-tier backup process continues. If there are no more data, then the first-tier backup process is complete.

Figure 8:
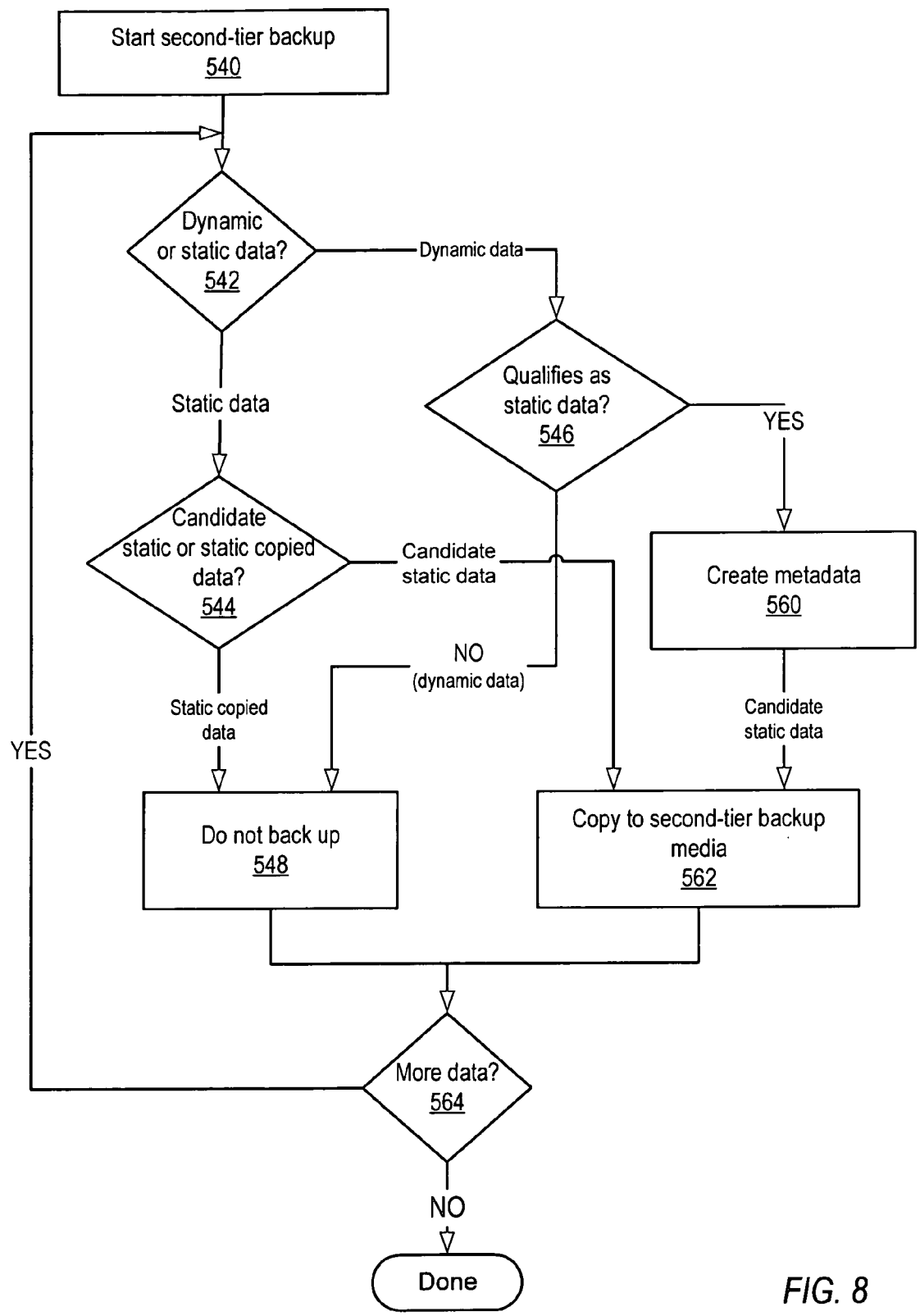
FIG. 8 is a flowchart illustrating a second-tier backup process according to one embodiment.

FIG. 8 is a flowchart illustrating a second-tier backup process according to one embodiment. As indicated at 540, a second-tier backup may be initiated to back up candidate static data from the file system to second-tier backup media on the data backup devices according to a user-defined schedule. Second-tier backups may be performed while the file system is operational, and may be performed during periods of relatively less activity. At 542, a data (e.g. a file) may be examined by the two-tier backup mechanism to determine if the data is static data or dynamic data. In one embodiment, only static data has associated metadata, so the presence or absence of metadata may be used to determine if the data is static or dynamic. In another embodiment, both dynamic and static data may have associated metadata, and the metadata may be examined to determine if the associated data is static or dynamic, for example by examining a status field for the data that indicates whether the data is dynamic data or static copied data. Other embodiments may use other mechanisms to determine if data is static or dynamic.

If the data is determined to be static at 542, the metadata may be examined by the two-tier backup process to determine if the static data is static copied data or candidate static data at 544. In one embodiment, the metadata may include an indication of the number of copies of the static data on second-tier backups and, if that number is sufficient (greater than or equal to a user-specified number of copies), then the static data is classified as static copied data. In another embodiment, the metadata may include a status field that indicates whether the data is static copied data or candidate static data. In yet another embodiment, information that indicates whether the data is static copied data or candidate static data may not be recorded in the metadata, but may instead be stored in a database such as database 310 of FIG. 5. If the static data is determined to be static copied data at 544, the static copied data is not backed up, as indicated at 548. If the static data is determined to be candidate static data at 544, then the candidate static data is copied to second-tier backup media at 562.

If the data is determined to be dynamic at 542, then the data may be examined to determine if it qualifies as static data at 546. In one embodiment, if the data is determined to be aged data (i.e., has existed on the file system but has not been modified for a user-specified period), then the data is classified as candidate static data. In other embodiments, one or more additional properties or aspects of the data may be considered when classifying the data as static or dynamic at 546. In these embodiments, some data may remain classified as dynamic data, and thus be backed on first-tier backups (and not on second-tier backups) even if the data qualifies as aged according to the user-specified period, if the data does not qualify under one or more additional properties or aspects. For example, in one embodiment, data may be classified as candidate static data if it meets user-defined specifications for size and/or name requirements, in addition to age requirements. Other embodiments may examine one or more additional properties or aspects of the data when classifying the data as candidate static data or dynamic data.

At 546, if the data is determined to be dynamic data, then the data is not copied to the second-tier backup media, as indicated at 548. If the data is determined to be candidate static data at 546, then metadata for use by the second-tier backup mechanism may be created for and associated with the data, as indicated at 560. The data is now classified as candidate static data, and is thus copied to the second-tier backup media as indicated at 562.

At 564, if there are more data, then the second-tier backup process continues. If there are no more data, then the second-tier backup process is complete.

FIG. 9 is a table illustrating the life cycle of a file in a file system implementing a two-tier backup mechanism according to one embodiment. This example assumes that the file is created on Friday 4 Jan. 2005, and is modified on Thursday 4 Jul. 2005. No other changes are made to the file. Using an embodiment of the two-tier backup mechanism, full (first-tier) backups of the file system occur each Sunday, and a cumulative incremental Monday through Saturday. On Fridays, the required second tier copies are made for any existing (and newly classified) candidate static files. The backup activity for the file is illustrated in the table of FIG. 9.

Figure 10:
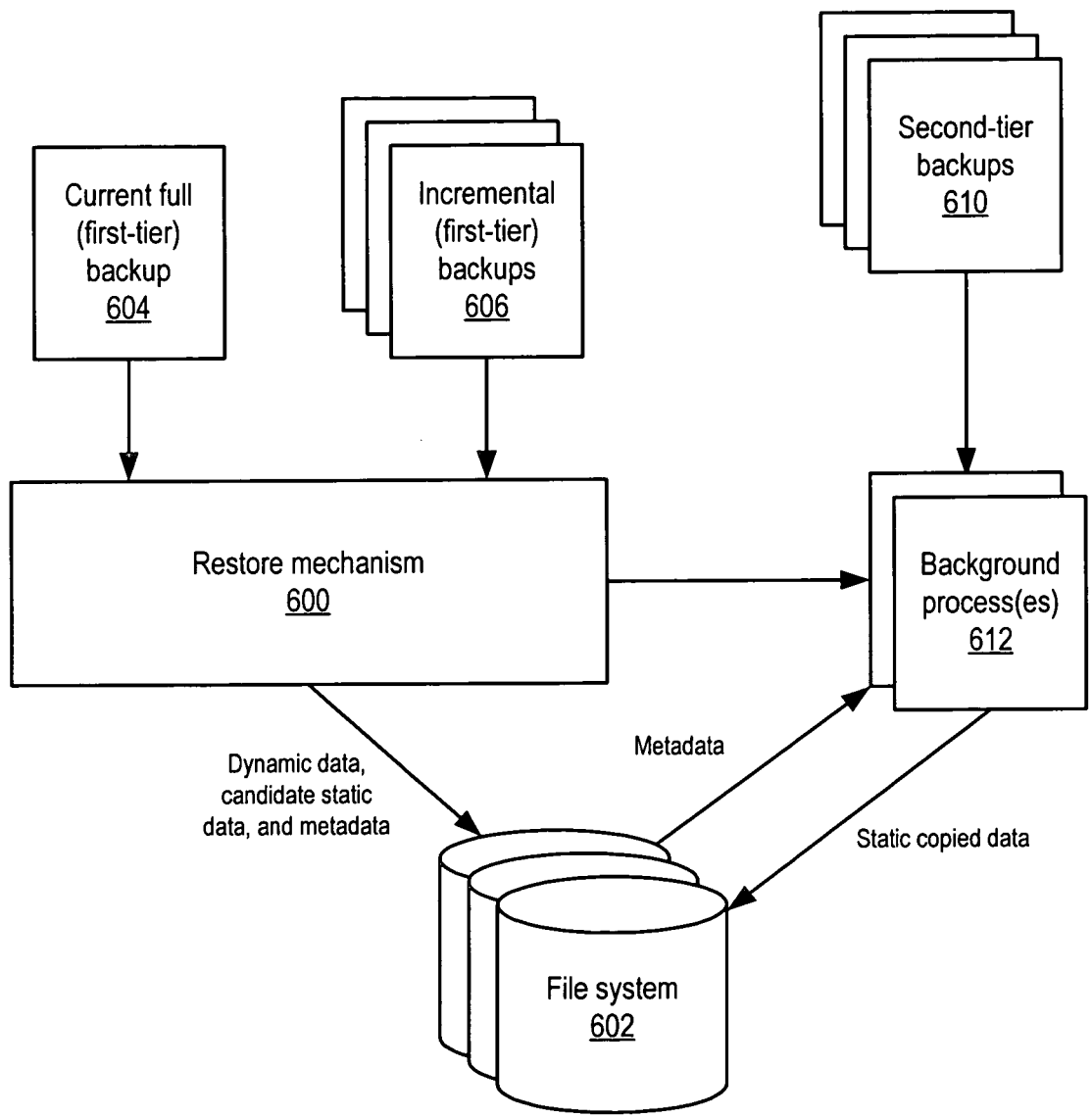
FIG. 10 illustrates a restore mechanism for restoring a file system from two-tiered backup media generated by the two-tier backup mechanism according to one embodiment.

As illustrated in FIG. 10, one embodiment may provide a restore mechanism for restoring a file system from two-tiered backup media generated by the two-tier backup mechanism. The restore mechanism 600 may first restore active (dynamic) data and candidate static data, as well as metadata for the static copied data, from the first-tier backup media (current full backup 604 and, if necessary, one or more incremental backups 606), to the file system 602. The file system 602 may then be used operationally. If necessary or desired, one or more background processes 612 may be launched to restore "second tier" static copied data from second-tier backups 610 to file system 602 using the metadata restored from the first-tier backup media after the file system 602 has been made operational. Note that the restore mechanism and the two-tier backup mechanism may be components of one application or may be implemented as separate applications.

In one embodiment, first-tier backups include the metadata for all static files and the file data for dynamic files and static files that were candidate static data at the time of the first-tier backup. In one embodiment, when a restore to the file system is performed from the first-tier backups (i.e. the last "full" backup and the incremental backups, if any), the metadata for all static files and the file data for the dynamic files and candidate static files are restored. In this embodiment, when candidate static files are restored, the entire file (i.e. the metadata and the file data) are restored. The files restored from the first-tier backup may be made available after the restore. File data for static copied files or purged files may then be restored as necessary or desired from the second-tier backups using the restored metadata.

In another embodiment, when a restore to the file system is performed from the first-tier backups, the file data for the dynamic files are restored, but only the metadata (or "stub") for the static files (candidate, static copied, and purged) may be restored (e.g. the inode, directory, DMAPI information, and any other metadata for a static file). After the file data for the dynamic files and the metadata for the static files are restored, the file system may be made operational and available for access by one or more applications. After the metadata for the static files are restored, some process or event may cause the file data for a static file to be copied back to disk from the first-tier or second-tier backups, if the file is a candidate static file, or from the second-tier backups, if the file is a static copied file or purged file. For example if a static file is accessed or, if HSM is implemented, if an HSM "stage" command is used on a static file, the file data may be restored from the first-tier or a second-tier backup.

In one embodiment, after restoring the dynamic files and metadata for static files from the first-tier backups, the file data for all static files for which the file data was online at the time of the full backup (candidate static and static copied files) may be restored. After the file data for the candidate static and static copied files has been restored, the file system has been restored to its state as of the last full backup.

In one embodiment, after the dynamic files and metadata for the static files are restored from the first-tier backups and the file system made operational, one or more background processes may be launched to restore file data for the candidate static files and static copied files that were online at the time of the last full backup.

Figure 11:
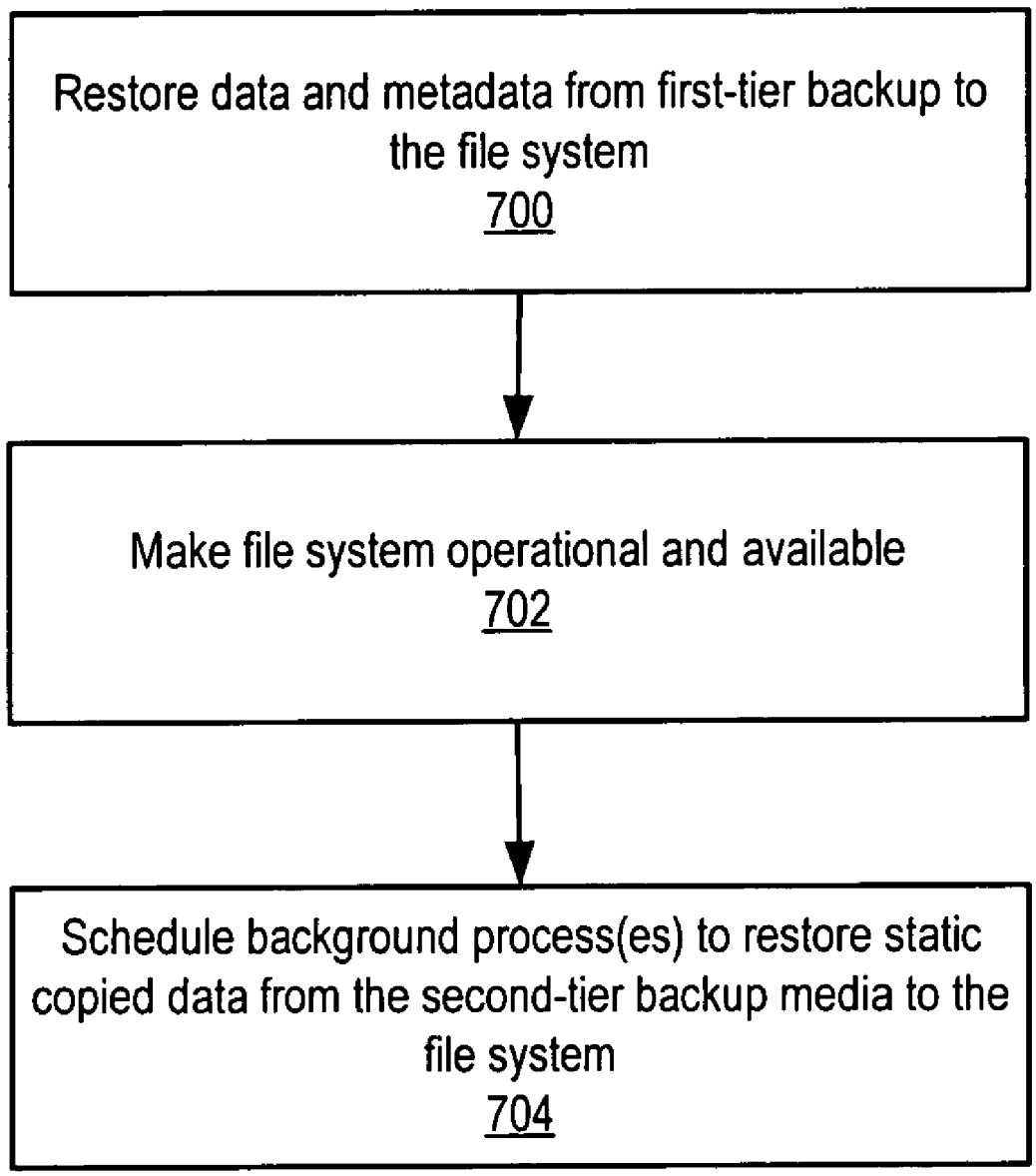
FIG. 11 is a flowchart illustrating a restore process from two-tier backup media according to one embodiment.

FIG. 11 is a flowchart illustrating a restore process from two-tier backup media according to one embodiment. As indicated at 700, dynamic data, candidate static data, and metadata associated with the static copied data are restored from a first-tier backup to the file system. As indicated at 702, after completion of the restore of the first-tier backup, the file system may be made operational so that applications may access the file system. Static copied data stored on the second-tier backups may not be necessary for normal operations on the file system. As indicated at 704, one or more background processes may be scheduled and/or launched to restore some or all of the static copied data from the second-tier backup media to the file system. The background process(es) may use the metadata restored at 700 to locate static copied data on the second-tier backup media. Generally, but not necessarily, the restore process will restore a most recent version of static copied data from the second-tier backup media. In one embodiment, once restored, the static copied data are not copied to subsequent first-tier backups; in other words, the static copied data remains classified as static copied data after restore. Similarly, in one embodiment, a restore from first-tier backup media does not change the status of candidate static data or dynamic data.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
one or more data storage devices comprising a file system;
one or more data backup devices; and
a two-tier backup mechanism configured to:
    determine static data in the file system, wherein static data are data in the file system that have not been modified for a specified period, wherein the static data includes static copied data for which a specified number of copies have been previously backed up to second-tier backup media and candidate static data for which less than a specified number of copies have been previously backed up to the second-tier backup media;
    periodically or aperiodically back up the candidate static data from the file system to the second-tier backup media on the data backup devices;
    periodically or aperiodically back up dynamic data and the candidate static data from the file system to first-tier backup media on the data backup devices, wherein the dynamic data are data in the file system that have been created or modified in the specified period; and
    periodically or aperiodically back up only metadata for the static copied data from the file system to the first-tier backup media.

2. The system as recited in claim 1, wherein the file system does not include infrastructure to support Hierarchical Storage Management (HSM).

3. The system as recited in claim 1, wherein the file system supports Hierarchical Storage Management (HSM) but HSM is not implemented on the file system.

4. The system as recited in claim 1, wherein the file system supports Hierarchical Storage Management (HSM) and HSM is implemented on the file system.

5. The system as recited in claim 1, wherein the two-tier backup mechanism is integrated with Hierarchical Storage Management (HSM) on the file system.

6. The system as recited in claim 1, further comprising a restore mechanism configured to:

restore the dynamic data, the candidate static data, and the metadata for the static copied data from a first-tier backup to the file system;

make the file system operational after said restore from the first-tier backup; and schedule one or more background processes to restore one or more portions of the static copied data from the second-tier backup media to the file system;

wherein the one or more background processes are configured to use the restored metadata for the static copied data to locate the static copied data on the second-tier backup media.

7. A system, comprising:

a processor; and a memory comprising program instructions, wherein the program instructions are executable by the processor to implement a two-tier backup mechanism configured to:

determine static data in a file system, wherein static data are data in the file system that have not been modified for a specified period, wherein the static data includes static copied data for which a specified number of copies have been previously backed up to second-tier backup media and candidate static data for which less than a specified number of copies have been previously backed up to the second-tier backup media;

periodically or aperiodically back up the candidate static data from a file system to the second-tier backup media;

periodically or aperiodically back up dynamic data and the candidate static data from the file system to first-tier backup media, wherein the dynamic data are data that have been created or modified in the specified period; and periodically or aperiodically back up only metadata for the static copied data from the file system to the first-tier backup media.

8. The system as recited in claim 7, wherein the file system does not include infrastructure to support Hierarchical Storage Management (HSM).

9. The system as recited in claim 7, wherein the file system supports Hierarchical Storage Management (HSM) but HSM is not implemented on the file system.

10. The system as recited in claim 7, wherein the file system supports Hierarchical Storage Management (HSM) and HSM is implemented on the file system.

11. The system as recited in claim 7, wherein the two-tier backup mechanism is integrated with Hierarchical Storage Management (HSM) on the file system.

12. The system as recited in claim 7, wherein the program instructions are executable by the processor to implement a restore mechanism configured to:

restore the dynamic data, the candidate static data, and the metadata for the static copied data from a first-tier backup to the file system;

make the file system operational after said restore from the first-tier backup; and schedule one or more background processes to restore one or more portions of the static copied data from the second-tier backup media to the file system;

wherein the one or more background processes are configured to use the restored metadata for the static copied data to locate the static copied data on the second-tier backup media.

13. A system, comprising:

means for determining static data in a file system, wherein static data are data in the file system that have not been modified for a specified period, wherein the static data includes static copied data for which a specified number of copies have been previously backed up to second-tier backup media and candidate static data for which less than a specified number of copies have been previously backed up to the second-tier backup media;

means for periodically or aperiodically backing up the candidate static data from a file system on one or more data storage devices to the second-tier backup media on one or more data backup devices;

means for periodically or aperiodically backing up dynamic data and the candidate static data from the file system to first-tier backup media on the data backup devices, wherein the dynamic data are data that have been created or modified in the specified period; and means for periodically or aperiodically backing up only metadata for the static copied data from the file system to the first-tier backup media.

14. A method, comprising:

determining static data in a file system, wherein static data are data in the file system that have not been modified for a specified period, wherein the static data includes static copied data for which a specified number of copies have been previously backed up to second-tier backup media and candidate static data for which less than a specified number of copies have been previously backed up to the second-tier backup media;

periodically or aperiodically backing up the candidate static data from the file system to the second-tier backup media;

periodically or aperiodically backing up dynamic data and the candidate static data from the file system to first-tier backup media, wherein the dynamic data are data that have been created or modified in the specified period; and periodically or aperiodically backing up only metadata for the static copied data from the file system to the first-tier backup media.

15. The method as recited in claim 14, wherein the file system does not include infrastructure to support Hierarchical Storage Management (HSM).

16. The method as recited in claim 14, wherein the file system supports Hierarchical Storage Management (HSM) but HSM is not implemented on the file system.

17. The method as recited in claim 14, wherein the file system supports Hierarchical Storage Management (HSM) and HSM is implemented on the file system.

18. The method as recited in claim 14, wherein the two-tier backup mechanism is integrated with Hierarchical Storage Management (HSM) on the file system.

19. The method as recited in claim 14, further comprising:

restoring the dynamic data, the candidate static data, and the metadata for the static copied data from a first-tier backup to the file system;

making the file system operational after said restoring from the first-tier backup; and restoring at least a portion of the static copied data from the second-tier backup media to the file system after said making the file system operational, wherein the restored metadata for the static copied data are used to locate the static copied data on the second-tier backup media.

20. A computer-accessible storage medium comprising, program instructions, wherein the program instructions are computer-executable to implement:

determining static data in a file system, wherein static data are data in the file system that have not been modified for a specified period, wherein the static data includes static copied data for which a specified number of copies have been previously backed up to second-tier backup media and candidate static data for which less than a specified number of copies have been previously backed up to the second-tier backup media;

periodically or aperiodically backing up the candidate static data from the file system to the second-tier backup media;

periodically or aperiodically backing up dynamic data and the candidate static data from the file system to first-tier backup media, wherein the dynamic data are data that have been created or modified in the specified period; and periodically or aperiodically backing up only metadata for the static copied data from the file system to the first-tier backup media.

21. The computer-accessible storage medium as recited in claim 20, wherein the file system does not include infrastructure to support Hierarchical Storage Management (HSM).

22. The computer-accessible storage medium as recited in claim 20, wherein the file system supports Hierarchical Storage Management (HSM) but HSM is not implemented on the file system.

23. The computer-accessible storage medium as recited in claim 20, wherein the file system supports Hierarchical Storage Management (HSM) and HSM is implemented on the file system.

24. The computer-accessible storage medium as recited in claim 20, wherein the two-tier backup mechanism is integrated with Hierarchical Storage Management (HSM) on the file system.

25. The computer-accessible storage medium as recited in claim 20, wherein the program instructions are further configured to implement:

restoring the dynamic data, the candidate static data, and the metadata for the static copied data from a first-tier backup to the file system;

making the file system operational after said restoring from the first-tier backup; and restoring at least a portion of the static copied data from the second-tier backup media to the file system after said making the file system operational, wherein the restored metadata for the static copied data are used to locate the static copied data on the second-tier backup media.

26. A system, comprising:
a processor; and
a memory comprising program instructions, wherein the program instructions are executable by the processor to implement a two-tier backup mechanism configured to:
  perform one or more second-tier backups to back up candidate static files from a file system to second-tier backup media, wherein the candidate static files are files that have not been modified for a specified period;
  perform a first-tier backup, wherein, in the first-tier backup, the two-tier backup mechanism is configured to, for each file on the file system:
    determine if the file is a dynamic file or a static file, wherein dynamic files are files that have been created or modified in the specified period and static files are files that have not been created or modified in the specified period;
    if the file is a dynamic file, copy the dynamic file to first-tier backup media;
    if the file is a static file, determine if the static file is a candidate static file or a static copied file according to a specified number of copies of the static file on the second-tier backup media;
    if the file is a candidate static file, copy the candidate static file to the first-tier backup media; and
    if the file is a static copied file, copy only metadata associated with the static copied file to the first-tier backup media.

27. The system as recited in claim 26, wherein Hierarchical Storage Management (HSM) is not implemented on the file system.

28. A method, comprising:
performing one or more second-tier backups to back up candidate static files from a file system to second-tier backup media, wherein the candidate static files are files that have not been modified for a specified period;
performing a first-tier backup, wherein said performing a first-tier backup comprises, for each file on the file system:
  determining if the file is a dynamic file or a static file according to the specified period, wherein dynamic files are files that have been created or modified in the specified period and static files are files that have not been created or modified in the specified period;
  if the file is a dynamic file, copying the dynamic file to first-tier backup media;
  if the file is a static file, determining if the static file is a candidate static file or a static copied file according to a specified number of copies of the static file on the second-tier backup media;
  if the file is a candidate static file, copying the candidate static file to the first-tier backup media; and
  if the file is a static copied file, copying only metadata associated with the static copied file to the first-tier backup media.

29. The method as recited in claim 28, wherein Hierarchical Storage Management (HSM) is not implemented on the file system.

30. A computer-accessible storage medium comprising, program instructions, wherein the program instructions are computer-executable to implement:
performing one or more second-tier backups to back up candidate static files from a file system to second-tier backup media, wherein the candidate static files are files that have not been modified for a specified period;
performing a first-tier backup, wherein said performing a first-tier backup comprises, for each file on the file system:
  determining if the file is a dynamic file or a static file, wherein dynamic files are files that have been created or modified in the specified period and static files are files that have not been created or modified in the specified period;
  if the file is a dynamic file, copying the dynamic file to first-tier backup media;
  if the file is a static file, determining if the static file is a candidate static file or a static copied file according to a specified number of copies of the static file on the second-tier backup media;
  if the file is a candidate static file, copying the candidate static file to the first-tier backup media; and
  if the file is a static copied file, copying only metadata associated with the static copied file to the first-tier backup media.

31. The computer-accessible storage medium as recited in claim 30, wherein Hierarchical Storage Management (HSM) is not implemented on the file system.

* * * * *